United States Patent
Ma et al.

(10) Patent No.: US 12,488,733 B2
(45) Date of Patent: Dec. 2, 2025

(54) DRIVING CIRCUIT, DISPLAY PANEL, AND DISPLAY DEVICE

(71) Applicant: Shenzhen China Star Optoelectronics Semiconductor Display Technology Co., Ltd., Guangdong (CN)

(72) Inventors: Xingwu Ma, Guangdong (CN); Qian Wang, Guangdong (CN); Chaoping Li, Guangdong (CN); Jianmin Nie, Guangdong (CN); Guanxian He, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/945,572

(22) Filed: Nov. 13, 2024

(65) Prior Publication Data
US 2025/0157385 A1 May 15, 2025

(30) Foreign Application Priority Data
Nov. 13, 2023 (CN) .......................... 202311510962.7

(51) Int. Cl.
*G09G 3/3266* (2016.01)
*G09G 3/20* (2006.01)

(52) U.S. Cl.
CPC ... *G09G 3/2096* (2013.01); *G09G 2300/0426* (2013.01); *G09G 2310/021* (2013.01); *G09G 2310/0224* (2013.01); *G09G 2310/0267* (2013.01); *G09G 2310/0289* (2013.01); *G09G 2310/06* (2013.01); *G09G 2340/0435* (2013.01)

(58) Field of Classification Search
CPC ......... G02F 1/133; G02F 1/1362; G09G 3/20; G09G 3/32; G09G 3/36; G09G 3/2096; G09G 3/3266; G09G 3/3233; G09G 3/3275; G09G 3/3291; G09G 5/00; G09G 2300/0426; G09G 2310/021; G09G 2310/0224; G09G 2310/0267; G09G 2310/0289; G09G 2310/06;
(Continued)

(56) References Cited

U.S. PATENT DOCUMENTS

| | | | |
|---|---|---|---|
| 2011/0012891 A1* | 1/2011 | Cheng .................. | G09G 3/3677 345/98 |
| 2023/0005445 A1* | 1/2023 | Liu ........................ | G11C 19/28 |
| 2024/0221683 A1* | 7/2024 | Park ..................... | G09G 3/3233 |

* cited by examiner

*Primary Examiner* — Chanh D Nguyen
*Assistant Examiner* — Nguyen H Truong
(74) *Attorney, Agent, or Firm* — PV IP PC; Wei Te Chung

(57) ABSTRACT

The present disclosure provides a driving circuit, a display panel and a display device. The driving circuit includes a control module, a level conversion module and a pull-down module. The control module is configured to output multiple initial clock signals to corresponding initial signal lines. The level conversion module is electrically connected to the initial signal lines, and is used to generate multiple target clock signals and output the multiple target clock signals to corresponding clock signal lines, the clock signal lines including odd-numbered clock signal lines and even-numbered clock signal lines. An input terminal of the pull-down module is electrically connected to the control module, an output terminal of the pull-down module is electrically connected to the clock signal lines, and the pull-down module is used to pull down voltage on the odd-numbered clock signal lines or pull down voltage on the even-numbered clock signal lines.

17 Claims, 5 Drawing Sheets

(58) Field of Classification Search
CPC .. G09G 2340/0435; H03K 5/13; G11C 19/28; G11C 27/04
See application file for complete search history.

DRIVING CIRCUIT, DISPLAY PANEL, AND DISPLAY DEVICE

CROSS-REFERENCE TO RELATED APPLICATIONS

This application claims priority to and the benefit of Chinese Patent Application No. 202311510962.7, filed on Nov. 13, 2023, the disclosure of which is incorporated herein by reference in its entirety.

TECHNICAL FIELD

The present disclosure relates to the field of display technology, and in particular, to a driving circuit, a display panel, and a display device.

BACKGROUND

In display technology, refresh rate is multiplied by changing the method of scanning, that is, changing the original progressive scanning into interlaced scanning. For example, an eight-in-eight-out level conversion chip is used to receive and amplify eight clock signals sent by a timing controller. Therefore, eight signal lines are essential to be arranged between the level conversion chip and the timing controller. Due to the characteristics of the clock signals, it is necessary to prevent coupling between adjacent signal lines during layout design, so that the difficulty of layout is increased.

SUMMARY

Embodiments of the present disclosure provide a driving circuit and a display panel to alleviate the technical problem in the prior art of the increased difficulty of layout design when designing the layout for the method of interlaced scanning due to the necessity of preventing coupling between adjacent signal lines.

In order to solve the above problem, the technical solutions provided in the present disclosure are provided as follows.

In a first aspect, the present disclosure provides a driving circuit including: a control module configured to generate a control signal and correspondingly output multiple initial clock signals to multiple initial signal lines; a level conversion module electrically connected to the initial signal lines and configured to generate multiple target clock signals according to the multiple initial clock signals, and correspondingly output the multiple target clock signals to multiple clock signal lines; and a pull-down module, where an input terminal of the pull-down module is electrically connected to the control module, an output terminal of the pull-down module is electrically connected to the clock signal lines, and the pull-down module is configured to pull down a voltage on odd-numbered clock signal lines or on even-numbered clock signal lines according to the control signal; wherein a number of the initial signal lines is smaller than a number of the clock signal lines.

In a second aspect, the present disclosure further provides a display panel including a driving circuit as described in any one of the above embodiments and a panel body, where the driving circuit includes a control module, a pull-down module and a level conversion module, the control module is electrically connected to input terminals of the multiple initial signal lines; an input terminal of the level conversion module is electrically connected to output terminals of the multiple initial signal lines, and an output terminal of the level conversion module is electrically connected to input terminals of the multiple clock signal lines; an input terminal of the pull-down module is electrically connected to the control module, and an output terminal of the pull-down module is electrically connected to the clock signal lines; and output terminals of the clock signal lines are electrically connected to the panel body.

In a third aspect, the present disclosure further provides a display device including a display panel as described above.

BRIEF DESCRIPTION OF THE DRAWINGS

In order to more clearly illustrate the technical solutions in the embodiments of the present disclosure, the accompanying drawings to be used in the description of the embodiment will be briefly introduced below, and it should be appreciated that the accompanying drawings in the following description are only some of the embodiment of the present disclosure, and other accompanying drawings can be obtained according to these drawings for the people skilled in the field without putting in the creative labor.

DETAILED DESCRIPTION

The following describes the technical solutions of the embodiments of the present disclosure clearly and completely with reference to the accompanying drawings in the embodiments of the present disclosure. It is apparent that the described embodiments are only parts but not all of the embodiments of the present disclosure. Based on the embodiments in present disclosure, all other embodiments obtained by those skilled in the art without making creative labor fall within the scope of protection of the present disclosure.

Figure 1:
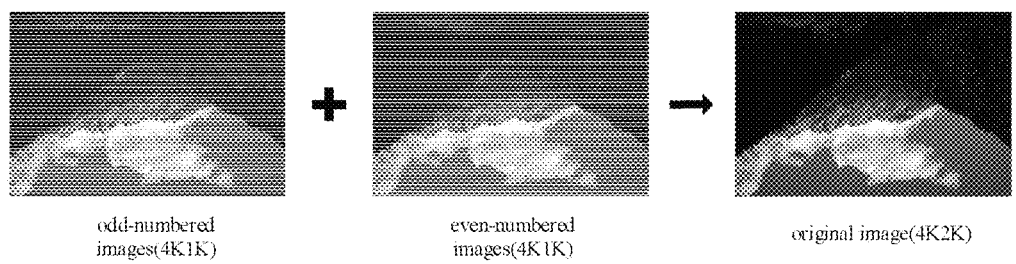
FIG. 1 is a schematic diagram of an image output of interlaced scanning in the prior art.
Figure 2:
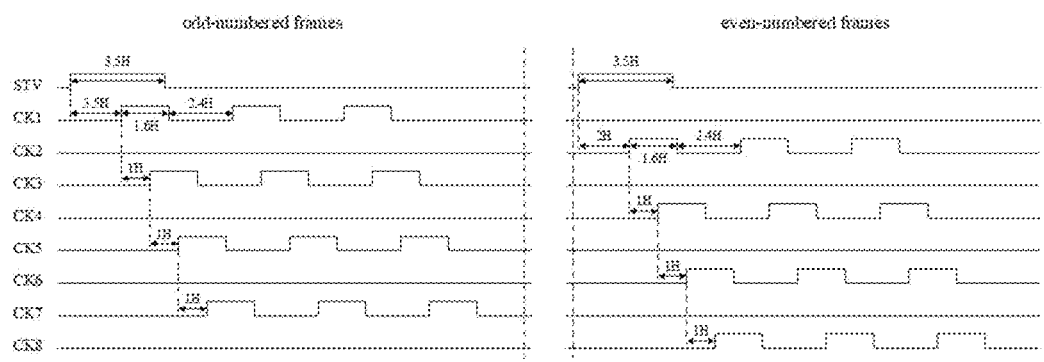
FIG. 2 is a timing diagram of clock signals of interlaced scanning in the prior art.

In the prior art, refresh rate is multiplied by changing the method of scanning, that is, changing the original progressive scanning into interlaced scanning. As shown in FIG. 1 by taking a panel of 4K60 Hz as an example, the function of doubling the refresh rate is achieved by converting 4K2K images to 4K1K images and halving the number of panel scanning lines, where the original image is split into odd-numbered images and even-numbered images to output, and scanning of the display panel in accordance with the odd-numbered lines or even-numbered lines can be achieved by switching off the CKV in even-numbered lines or CKV in odd-numbered lines. As shown in FIG. 2, for the CKV timing of interlaced scanning, the rate is multiplied in the interlaced scanning method by opening and closing odd-numbered gates and even-numbered gates through the odd-numbered CKV signals and even-numbered CKV signals.

Figure 3:
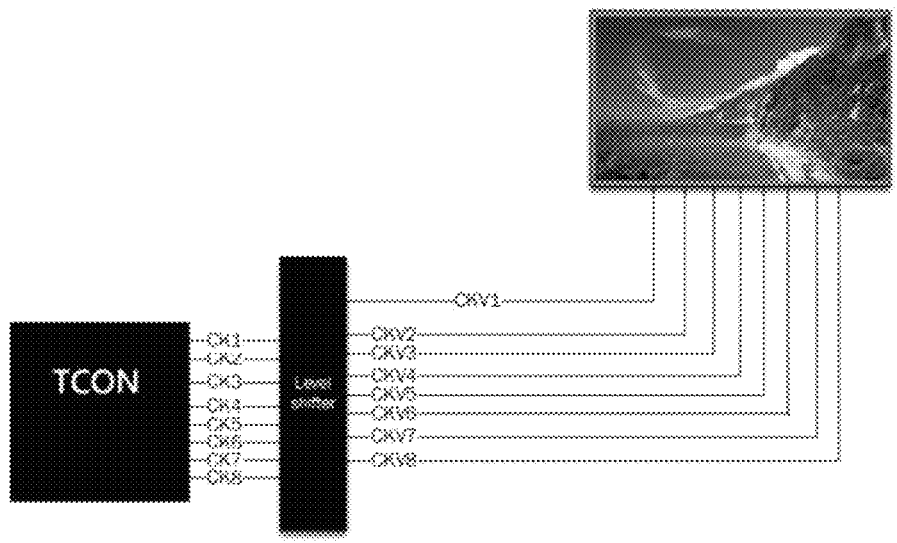
FIG. 3 is a circuit diagram of interlaced scanning in the prior art.

As shown in FIG. 3 for the circuit diagram of the driving circuit in the interlaced scanning of the prior art, an eight-in-eight-out level conversion chip is used to achieve the timing of the clock signals required for the gate driving circuit in the interlaced scanning. That means, the timing controller outputs eight initial clock signals, and the level conversion chip converts the eight initial clock signals so as to obtain eight target clock signals. Therefore, eight signal lines are required between the timing controller and the level conversion chip to transmit initial clock signals. Based on the characteristics of clock signals, coupling between adjacent signal lines is susceptible to occur. Therefore, when designing the layout, it is necessary to ensure that there is a sufficient gap between adjacent signal lines. However, since the overall layout space is limited, the layout design is difficult.

Embodiments of the present disclosure provide a driving circuit and a display panel to improve the technical problem in the prior art of the increased difficulty for layout when designing it in the interlaced scanning method due to the necessity of preventing coupling between adjacent signal lines.

Figure 4:
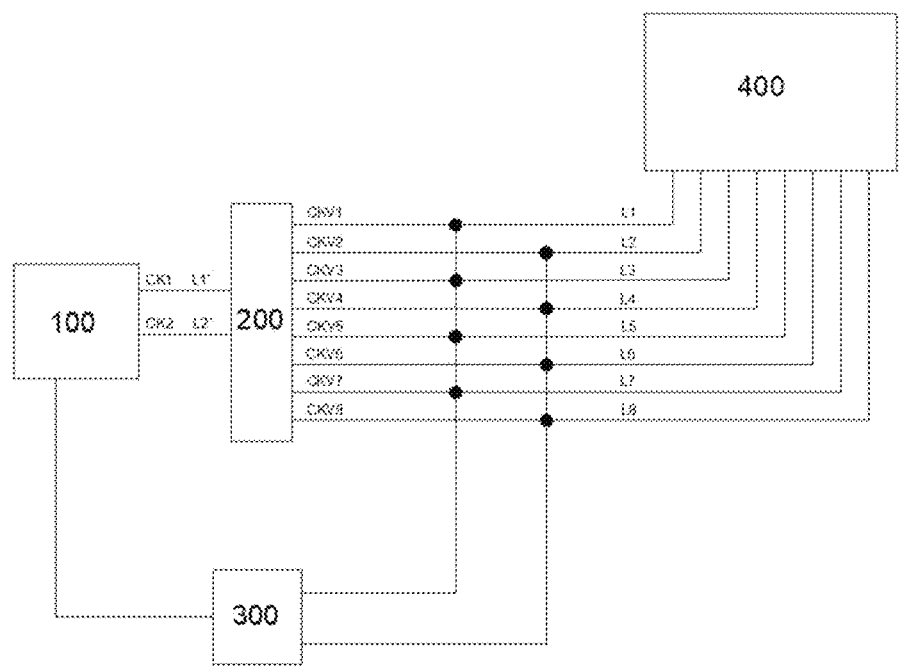
FIG. 4 is a module schematic diagram of a driving circuit according to an embodiment of the present disclosure.

To solve the above problems, embodiments of the present disclosure provide a driving circuit. FIG. 4 is a schematic module diagram of a driving circuit provided in an embodiment of the present disclosure. The driving circuit is used to output a target clock signal to a panel body 400, specifically, to output the target clock signal to a gate driving circuit of the panel body 400. It can be understood that the panel body 400 includes sub-pixels for function of displaying, gate driving circuits and source-class driving circuits for driving the sub-pixels.

Referring to FIG. 4, the driving circuit includes a control module 100, a level conversion module 200, and a pull-down module 300. The control module 100 is configured to generate a control signal P and output multiple corresponding initial clock signals to multiple initial signal lines. The level conversion module 200 is electrically connected to the initial signal lines, and is configured to generate multiple target clock signals according to the multiple initial clock signals, and output the multiple target clock signals to the corresponding multiple clock signal lines. An input terminal of the pull-down module 300 is electrically connected to the control module 100. Output terminals of the pull-down module 300 are electrically connected to the clock signal line and are configured to pull down voltage on the odd-numbered clock signal lines or on the even-numbered clock signal lines according to the control signal P. The number of the initial signal lines is smaller than the number of the clock signal lines.

It is to be clarified that the level conversion module 200 generates the multiple target clock signals simultaneously based on the multiple initial clock signals, i.e., each of the clock signal lines has a corresponding target clock signal at the same moment. The interlaced scanning method, on the one hand, requires that the target clock signals on the even-numbered clock signal lines are not output to the gate driving circuitry during odd-numbered frames, and on the other hand, requires that the target clock signals on the odd-numbered clock signal lines are not output to the gate driving circuitry during even-numbered frames. As a result, in the embodiment, the pull-down module 300 pulls down the voltage on the even-numbered clock signal lines during odd-numbered frames to ensure that no signal is output on the even-numbered clock signal lines, and pulls down the voltage on the odd-numbered clock signal lines during even-numbered frames to ensure that no signal is output on the odd-numbered clock signal lines, thereby realizing the timing of interlaced scanning.

It can be understood that, with respect to the prior art, the present disclosure generates the required target clock signals with fewer initial clock signals, and pulls down the voltage on the odd-numbered clock signal lines or the even-numbered clock signal lines through the pull-down module 300. Thus, compared with prior art, the interlaced scanning mode can be achieved in the present disclosure by providing fewer initial clock signals. Therefore, fewer clock signal lines between the control module 100 and the level conversion module 200 are required in the present disclosure to ensure enough layout space, so that coupling between adjacent signal lines is prevented.

In the embodiment, by configuring the level conversion module 200 to generate target clock signals based on fewer initial clock signals, and by configuring the pull-down module 300 to pull down the voltage on the odd-numbered clock signal lines or on the even-numbered clock signal lines, an improvement of the interlaced scanning method can be realized in the present disclosure by providing fewer initial clock signals with respect to the prior art. Therefore, with respect to the prior art, fewer initial clock signal lines are required for the control module and the level conversion module of the present disclosure, and there is enough layout space to prevent coupling between adjacent signal lines, thereby alleviating the technical problem in the prior art of the increased difficulty of layout design when designing a layout for the method of interlaced scanning due to the necessity of preventing coupling between adjacent signal lines.

Figure 5:
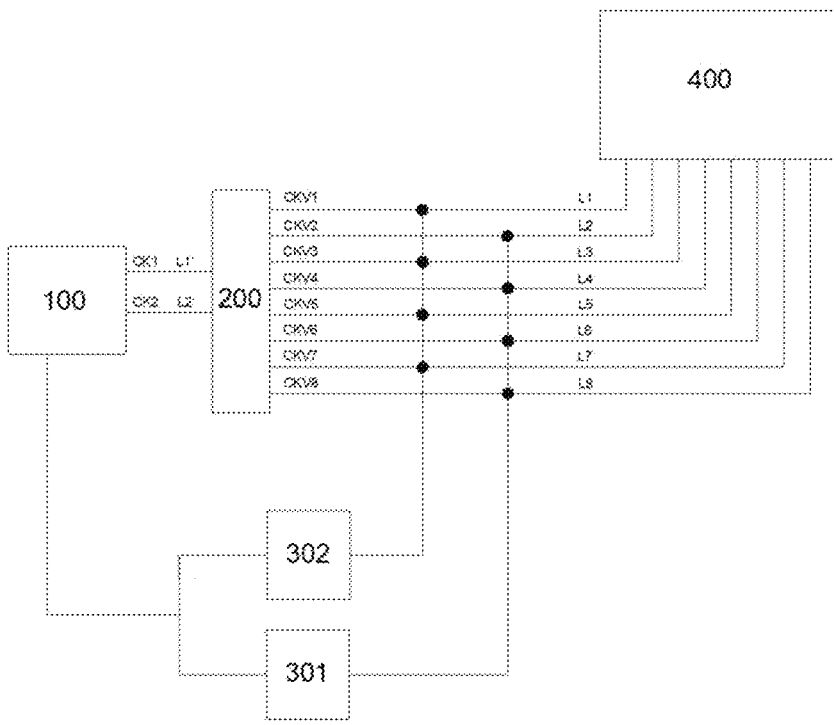
FIG. 5 is a module schematic diagram of a driving circuit according to an embodiment of the present disclosure.

FIG. 5 is a module schematic diagram of a driving circuit in an embodiment of the present disclosure. In the embodiment, the control module 100 is electrically connected to the two initial signal lines (L1', L2'), and the two initial signal lines respectively output the first initial clock signal CK1 and the second initial clock signal CK2. The level conversion module 200 generates eight target clock signals (CKV1-CKV8) based on the two initial signal lines. Therefore, the number of the corresponding clock signal lines is also eight, including L1, L2, L3, L4, L5, L6, L7, and L8.

Referring to FIG. 5, in the embodiment, the pull-down module 300 includes a first pull-down module 301 and a second pull-down module 302, wherein the first pull-down module 301 is used to pull down the voltage on the even-numbered clock signal lines, and the second pull-down module 302 is used to pull down the voltage on the odd-numbered clock signal lines. Specifically, the input terminal of the first pull-down module 301 is electrically connected to the control module 100, and the output terminal of the first pull-down module 301 is electrically connected to the even-numbered clock signal lines. The input terminal of the second pull-down module 302 is electrically connected to the control module 100, and the output terminal of the second pull-down module 302 is electrically connected to the odd-numbered clock signal lines. The first pull-down module 301 pulls down the voltage on the even-numbered clock signal lines under the control of the control signal P. The second pull-down module 302 pulls down the voltage on the odd-numbered clock signal lines under the control of the control signal P. It should be noted that, in order to realize interlaced scanning, only one of the first pull-down module 301 and the second pull-down module 302 is turned on at the same time under the control of the control signal P.

Figure 6:
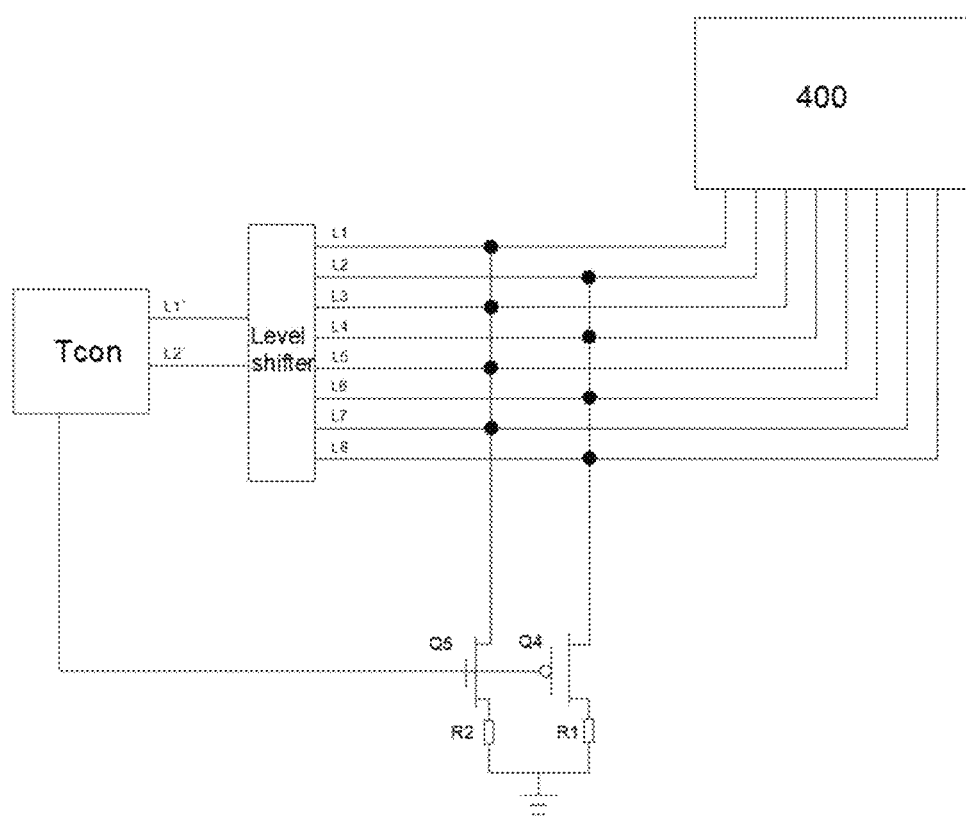
FIG. 6 is a circuit schematic diagram of a driving circuit according to an embodiment of the present disclosure.

FIG. 6 is a circuit schematic diagram of a driving circuit in an embodiment.

Referring to FIG. 6, in the embodiment, the first pull-down module 301 and the second pull-down module 302 are both composed of one switching transistor. Therefore, the pull-down module 300 can be implemented with two transistors, which occupies less space with less difficulty to be implied.

Specifically, the first pull-down module 301 includes the fourth switching transistor Q4, and the second pull-down module 302 includes the fifth switching transistor Q5. The gate electrode of the fourth switching transistor Q4 is electrically connected to the control module 100 to receive the control signal P. One of the source electrode and the drain electrode of the fourth switching transistor Q4 is electrically connected to the even-numbered clock signal lines, and the other one of the source electrode and the drain electrode of the fourth switching transistor Q4 is grounded. The gate electrode of the fifth switching transistor Q5 is electrically connected to the control module 100 to receive the control signal P. One of the source electrode and the drain electrode of the fourth switching transistor Q5 is electrically connected to the odd-numbered clock signal lines, and the other one of the source electrode and the drain electrode of the fifth switching transistor Q5 is grounded.

It can be understood that in order to achieve time-sharing conduction of the first pull-down module 301 and the second pull-down module 302 under the control of the same control signal P, one of the fourth switching transistor Q4 and the fifth switching transistor Q5 is an N-type transistor, another of the fourth switching transistor Q4 and the fifth switching transistor Q5 is a P-type transistor.

For example, when the fourth switching transistor Q4 is a P-type transistor and the fifth switching transistor Q5 is an N-type transistor, and when the control signal P is high level, the fifth switching transistor Q5 is turned on and pulls down the voltage on the odd-numbered clock signal lines (L1, L3, L5, L7), while the fourth switching transistor Q4 is turned off and the voltage on the even-numbered clock signal lines (L2, L4, L6, L8) is not pulled down, where the corresponding target clock signals, i.e., CKV2, CKV4, CKV6, CKV8, are normally output.

For example, when the fourth switching transistor Q4 is an N-type transistor and the fifth switching transistor Q5 is a P-type transistor, and when the control signal P is at a high level, the fourth switching transistor Q4 is turned on and pulls down the voltage on the even-numbered signal lines (L2, L4, L6, L8), while the fifth switching transistor Q5 is turned off and the voltage on the odd-numbered the clock signal lines (L1, L3, L5, L7) is not pulled down, where the corresponding target clock signals, i.e., CKV1, CKV3, CKV5, CKV7, are normally output.

It can be understood that in odd-numbered frames, the voltage on the even-numbered clock signal lines is pulled down, and the target clock signals (CKV1, CKV3, CKV5, CKV7) on the odd-numbered clock signal lines are normally output. In even-numbered frames, the voltage on the odd-numbered clock signal lines is pulled down, and the target clock signals (CKV2, CKV4, CKV6, CKV8) on the even-numbered clock signal lines are output normally.

In some embodiments, the pull-down module further includes a first resistor R1 and a second resistor R2. The fourth switching transistor Q4 and the fifth switching transistor Q5 are grounded respectively through the first resistor R1 and the second resistor R2 to protect the fourth switching transistor Q4 and the fifth switching transistor Q5 from being broken down by large current.

Figure 7:
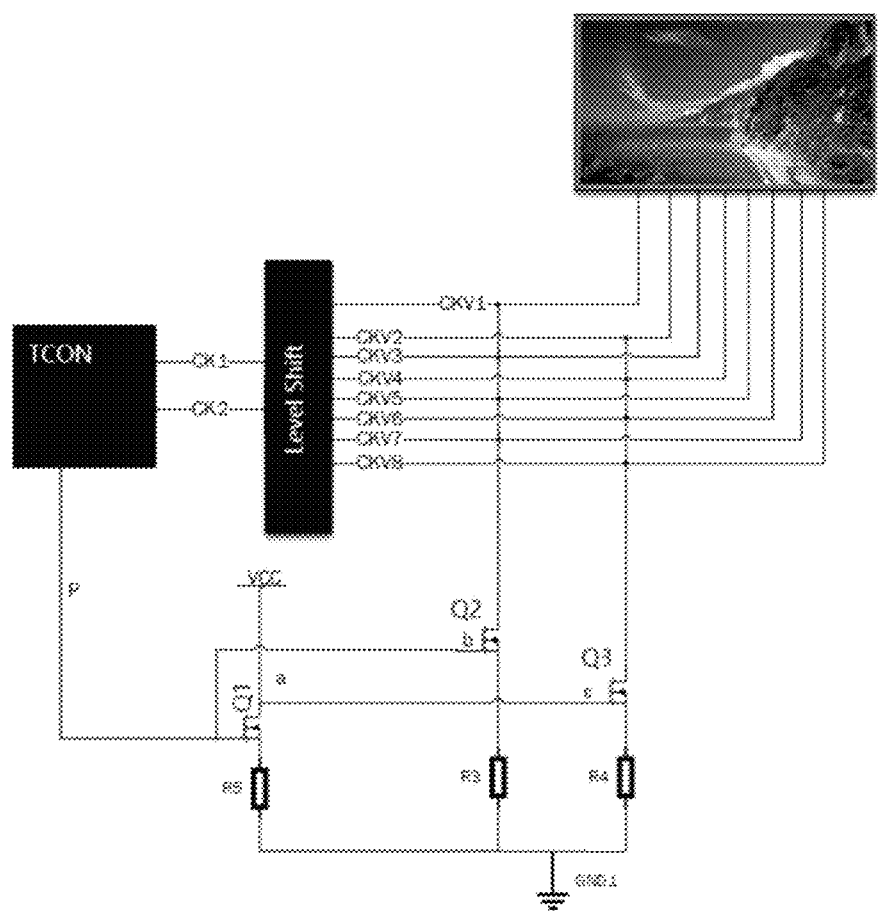
FIG. 7 is a circuit schematic diagram of a driving circuit according to an embodiment of the present disclosure.
Figure 8:
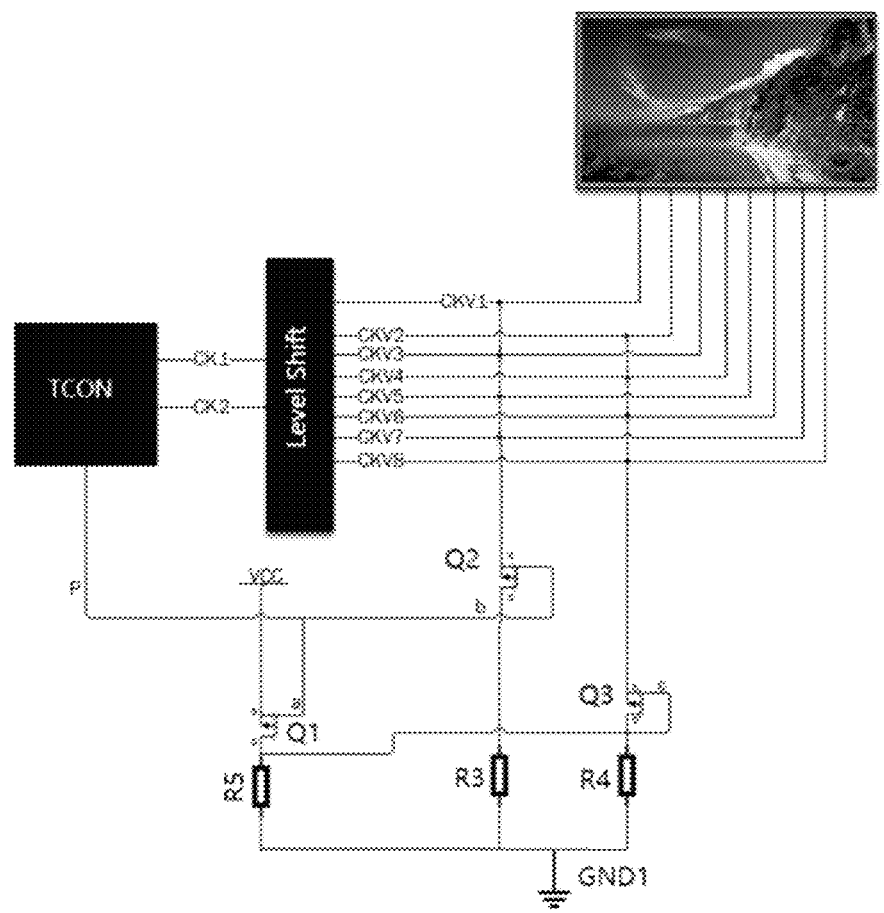
FIG. 8 is a circuit schematic diagram of a driving circuit according to an embodiment of the present disclosure.

In the above embodiments, the pull-down module 300 implemented with two transistors is shown. FIG. 7 and FIG. 8 show solutions for implementing the pull-down module 300 using three transistors in other embodiments.

Referring to FIG. 7, in an embodiment, the first pull-down module 301 includes a first switching transistor Q1 and a third switching transistor Q3. The gate electrode of the first switching transistor Q1 is electrically connected to the control module 100 to receive the control signal P. One of the source electrode and the drain electrode of the first switching transistor Q1 is electrically connected to the power supply voltage terminal, and the other one of the source electrode and the drain electrode of the first switching transistor Q1 is grounded. One of the source electrode and the drain electrode of the first switching transistor Q1 is electrically connected to the gate electrode of the third switching transistor Q3, the other one of the source electrode and the drain electrode of third switching transistor Q3 is electrically connected to the even-numbered clock signal lines, and the other one of the source electrode and the drain electrode of the third switching transistor Q3 is grounded.

The second pull-down module 302 includes a second switching transistor Q2. The gate electrode of the second switching transistor Q2 is electrically connected to the control module 100 to receive the control signal P. One of the source electrode and the drain electrode of the second switching transistor Q2 is electrically connected to the odd-numbered clock signal lines, and the other one of the source electrode and the drain electrode of the second switching transistor Q2 is grounded to protect the first switching transistor Q1, the second switching transistor Q2 and the third switching transistor Q3 from being broken down by large current.

It can be understood that the conduction states of the first pull-down module 301 and the second pull-down module 302 are determined by the level of the control signal P and the type of the corresponding transistor.

When the first switching transistor Q1, the second switching transistor Q2, and the third switching transistor Q3 are all N-type transistors, if the control signal P is at a low level and point b is in low potential, the first switching transistor Q1 and the second switching transistor Q2 are turned off, point a and point c are in high potential, and the third switching transistor Q3 is turned on. Therefore, the voltage on the even-numbered clock signal lines (L2, L4, L6, L8) is pulled down, and the target clock signals (CKV1, CKV3, CKV5, CKV7) on the odd-numbered clock signal lines (L1, L3, L5, L7) are normally output to the gate driving circuit.

When the control signal P is at a high level and point b is in high potential, the first switching transistor Q1 and the second switching transistor Q2 are turned on, the voltages at point a and point c are pulled down, and the third switching Transistor Q3 is turned off. Therefore, the voltage on the odd-numbered clock signal lines (L1, L3, L5, L7) is pulled down, and the target clock signals (CKV2, CKV4, CKV6, CKV8) on the even-numbered clock signal lines (L2, L4, L6, L8) are normally output to the gate driving circuit.

In an embodiment, the first switching transistor Q1, the second switching transistor Q2, and the third switching transistor Q3 are all P-type transistors. When the first switching transistor Q1, the second switching transistor Q2, and the third switching transistor Q3 are all P-type transistors, the conduction states thereof are opposite to the above-mentioned conduction states when they are all N-type transistors, the description of which is therefore omitted.

In some embodiments, the pull-down module 300 further comprises a third resistor R3, a fourth resistor R4, and a fifth resistor R5. The first switching transistor Q1, the second switching transistor Q2, and the third switching transistor Q3 are grounded respectively through the fifth resistor R5, the third resistor R3, and the fourth resistor R4.

In some embodiments, the control module 100 is a timing control chip, and the level conversion module 200 is a level conversion chip.

In some embodiments, the level conversion chip is the model of Level Shifter IC LP6295, which generates multiple target clock signals for simultaneous output based on the two input clock signals.

An embodiment of the present disclosure also provides a display panel, which includes a panel body 400 and a driving circuit. The driving circuit includes a control module 100, a level conversion module 200 and a pull-down module 300. The control module 100 is configured to generate a control signal P, and the control module 100 is electrically connected to input terminals of multiple initial signal lines so as to output corresponding multiple initial clock signals to the multiple initial signal lines. Input terminals of the level conversion module 200 are electrically connected to output terminals of the multiple initial signal lines, and output terminals of the level conversion module 200 are electrically connected to input terminals of multiple clock signal lines. The level conversion module 200 is configured to generate multiple target clock signals according to the multiple initial clock signals, and output the multiple target clock signals to corresponding clock signal lines. The input of the pull-down module 300 is electrically connected to the control module 100, and the outputs of the pull-down module 300 are electrically connected to the clock signal lines. The pull-down module 300 is configured to pull down voltage on the odd-numbered clock signal lines or on the even-numbered clock signal lines according to the control signal P. The output terminals of the clock signal lines are electrically connected to the panel body 400. The number of the initial signal lines is smaller than the number of the clock signal lines.

It can be understood that, with respect to the prior art, the present disclosure generates the required target clock signal with a smaller number of initial clock signals, and pulls down the voltage on the odd-numbered clock signal lines or the even-numbered clock signal lines through the pull-down module 300. Thus, compared with prior art, the interlaced scanning mode can be achieved in the present disclosure by providing fewer initial clock signals. Therefore, fewer clock signal lines between the control module 100 and the level conversion module 200 are required in the present disclosure to ensure enough layout space, so that coupling between adjacent signal lines is prevented.

In the embodiment, by configuring the level conversion module 200 to generate target clock signals based on fewer initial clock signals, and by configuring the pull-down module 300 to pull down the voltage on the odd-numbered clock signal lines or on the even-numbered clock signal lines, an improvement of the interlaced scanning method can be realized in the present disclosure by providing fewer initial clock signals with respect to the prior art. Therefore, with respect to the prior art, fewer initial clock signal lines are required for the control module and the level conversion module of the present disclosure, and there is enough layout space to prevent coupling between adjacent signal lines, thereby alleviating the technical problem in the prior art of the increased difficulty of layout design when designing a layout for the method of interlaced scanning due to the necessity of preventing coupling between adjacent signal lines.

An embodiment of the present disclosure also provides a display device, including the display panel described in the above embodiments.

In summary, although the present disclosure has been disclosed above in terms of preferred embodiments, the above preferred embodiments are not intended to limit the present disclosure. Those of ordinary skill in the art can make various modifications without departing from the idea and the scope of the present disclosure. Therefore, the protection scope of the present disclosure shall be based on the scope defined by the claims.

What is claimed is:

1. A driving circuit, wherein the driving circuit comprises:
   a control module configured to generate a control signal and correspondingly output multiple initial clock signals to multiple initial signal lines;
   a level conversion module electrically connected to the initial signal lines and configured to generate multiple target clock signals according to the multiple initial clock signals, and correspondingly output the multiple target clock signals to multiple clock signal lines, wherein the multiple clock signal lines comprise odd-numbered clock signal lines and even-numbered clock signal lines; and
   a pull-down module, wherein an input terminal of the pull-down module is electrically connected to the control module, an output terminal of the pull-down module is electrically connected to the clock signal lines, and the pull-down module is configured to pull down a voltage on the odd-numbered clock signal lines or on the even-numbered clock signal lines according to the control signal;
   wherein a number of the initial signal lines is smaller than a number of the clock signal lines.

2. The driving circuit according to claim 1, wherein the pull-down module comprises:
   a first pull-down module, wherein an input terminal of the first pull-down module is electrically connected to the control module, an output terminal of the first pull-down module is electrically connected to the even-numbered clock signal lines, and the first pull-down module is controlled by the control signal to pull down the voltage on the even-numbered clock signal lines; and
   a second pull-down module, wherein an input terminal of the second pull-down module is electrically connected to the control module, an output terminal of the second pull-down module is electrically connected to the odd-numbered clock signal lines, and the second pull-down module is controlled by the control signal to pull down the voltage on the odd-numbered clock signal lines;
   wherein one of the first pull-down module and the second pull-down module is controlled by the control signal to be turned on, and meanwhile, another of the first pull-down module and the second pull-down module is controlled by the control signal to be turned off.

3. The driving circuit according to claim 2, wherein the first pull-down module comprises:
   a first switching transistor, wherein a gate electrode of the first switching transistor is electrically connected to the control module to receive the control signal, one of a source electrode and a drain electrode of the first switching transistor is electrically connected to a power supply voltage terminal, and another of the source electrode and the drain electrode of the first switching transistor is grounded; and a third switching transistor, wherein a gate electrode of the third switching transistor is electrically connected to one of the source electrode and the drain electrode of the first switching transistor, one of a source electrode and a drain electrode of the third switching transistor is electrically connected to the even-numbered clock signal lines, and another of the source electrode and the drain electrode of the third switching transistor is grounded.

4. The driving circuit according to claim 3, wherein the second pull-down module comprises:
a second switching transistor, wherein a gate electrode of the second switching transistor is electrically connected to the control module to receive the control signal, one of a source electrode and a drain electrode of the second switching transistor is electrically connected to the odd-numbered clock signal lines, and another of the source electrode and the drain electrode of the second switching transistor is grounded.

5. The driving circuit according to claim 4, wherein the first switching transistor, the second switching transistor, and the third switching transistor are all N-type transistors or P-type transistors.

6. The driving circuit according to claim 2, wherein the first pull-down module comprises a fourth switching transistor, a gate electrode of the fourth switching transistor is electrically connected to the control module to receive the control signal, one of a source electrode and a drain electrode of the fourth switching transistor is electrically connected to the even-numbered clock signal lines, and another of the source electrode and the drain electrode of the fourth switching transistor is grounded; and
the second pull-down module comprises a fifth switching transistor, a gate electrode of the fifth switching transistor is electrically connected to the control module to receive the control signal, one of a source electrode and a drain electrode of the fifth switching transistor is electrically connected to the odd-numbered clock signal lines, and another one of the source electrode and the drain electrode of the fifth switching transistor is grounded;
wherein one of the fourth switching transistor and the fifth switching transistor is an N-type transistor, and another of the fourth switching transistor and the fifth switching transistor is a P-type transistor.

7. The driving circuit according to claim 1, wherein the number of the initial signal lines is two, the two initial signal lines respectively output a first initial clock signal and a second initial clock signal, and the level conversion module generates eight target clock signals according to the first initial clock signal and the second initial clock signal.

8. The driving circuit according to claim 7, wherein the control module is a timing control chip, and the level conversion module is a level conversion chip.

9. A display panel, wherein the display panel comprises a driving circuit and a panel body,
the driving circuit comprises:
a control module configured to generate a control signal and correspondingly output multiple initial clock signals to multiple initial signal lines;
a level conversion module electrically connected to the initial signal lines and configured to generate multiple target clock signals according to the multiple initial clock signals, and correspondingly output the multiple target clock signals to multiple clock signal lines, wherein the multiple clock signal lines comprise odd-numbered clock signal lines and even-numbered clock signal lines; and
a pull-down module, wherein an input terminal of the pull-down module is electrically connected to the control module, an output terminal of the pull-down module is electrically connected to the clock signal lines, and the pull-down module is configured to pull down a voltage on the odd-numbered clock signal lines or on the even-numbered clock signal lines according to the control signal;
wherein a number of the initial signal lines is smaller than a number of the clock signal lines,
the control module is electrically connected to input terminals of multiple initial signal lines;
an input terminal of the level conversion module is electrically connected to output terminals of the multiple initial signal lines, and an output terminal of the level conversion module is electrically connected to input terminals of multiple clock signal lines;
an input terminal of the pull-down module is electrically connected to the control module, and an output terminal of the pull-down module is electrically connected to the multiple clock signal lines; and
output terminals of the clock signal lines are electrically connected to the panel body.

10. The display panel according to claim 9, wherein the pull-down module comprises:
a first pull-down module, wherein an input terminal of the first pull-down module is electrically connected to the control module, an output terminal of the first pull-down module is electrically connected to the even-numbered clock signal lines, the first pull-down module is controlled by a control signal from the control module to pull down the voltage on the even-numbered clock signal lines; and
a second pull-down module, wherein an input terminal of the second pull-down module is electrically connected to the control module, an output terminal of the second pull-down module is electrically connected to the odd-numbered clock signal lines, and the second pull-down module is controlled by the control signal from the control module to pull down the voltage on the odd-numbered clock signal lines;
wherein one of the first pull-down module and the second pull-down module is controlled by the control signal to be turned on, and meanwhile, another of the first pull-down module and the second pull-down module is controlled by the control signal to be turned off.

11. The display panel according to claim 10, wherein the first pull-down module comprises:
a first switching transistor, wherein a gate electrode of the first switching transistor is electrically connected to the control module to receive the control signal, one of a source electrode and a drain electrode of the first switching transistor is electrically connected to a power supply voltage terminal, and another of the source electrode and the drain electrode of the first switching transistor is grounded; and
a third switching transistor, wherein a gate electrode of the third switching transistor is electrically connected to one of the source electrode and the drain electrode of the first switching transistor, one of a source electrode and a drain electrode of the third switching transistor is electrically connected to the even-numbered clock signal lines, and another of the source electrode and the drain electrode of the third switching transistor is grounded.

12. The display panel according to claim 11, wherein the second pull-down module comprises:
a second switching transistor, wherein a gate electrode of the second switching transistor is electrically connected to the control module to receive the control signal, one of a source electrode and a drain electrode of the second switching transistor is electrically connected to the odd-numbered clock signal lines, and another of the source electrode and the drain electrode of the second switching transistor is grounded.

13. The display panel according to claim 12, wherein the first switching transistor, the second switching transistor, and the third switching transistor are all N-type transistors or P-type transistors.

14. The display panel according to claim 10, wherein the first pull-down module comprises a fourth switching transistor, a gate electrode of the fourth switching transistor is electrically connected to the control module to receive the control signal, one of a source electrode and a drain electrode of the fourth switching transistor is electrically connected to the even-numbered clock signal lines, and another of the source electrode and the drain electrode of the fourth switching transistor is grounded; and
the second pull-down module comprises a fifth switching transistor, a gate electrode of the fifth switching transistor is electrically connected to the control module to receive the control signal, one of a source electrode and a drain electrode of the fifth switching transistor is electrically connected to the odd-numbered clock signal lines, and another one of the source electrode and the drain electrode of the fifth switching transistor is grounded;
wherein one of the fourth switching transistor and the fifth switching transistor is an N-type transistor, and another of the fourth switching transistor and the fifth switching transistor is a P-type transistor.

15. The display panel according to claim 9, wherein the number of the initial signal lines is two, the two initial signal lines respectively output a first initial clock signal and a second initial clock signal, and the level conversion module generates eight target clock signals according to the first initial clock signal and the second initial clock signal.

16. The display panel according to claim 15, wherein the control module is a timing control chip, and the level conversion module is a level conversion chip.

17. A display device, wherein the display device comprises a display panel, the display panel comprises a driving circuit and a panel body,
the driving circuit comprises:
a control module configured to generate a control signal and correspondingly output multiple initial clock signals to multiple initial signal lines;
a level conversion module electrically connected to the initial signal lines and configured to generate multiple target clock signals according to the multiple initial clock signals, and correspondingly output the multiple target clock signals to multiple clock signal lines, wherein the multiple clock signal lines comprise odd-numbered clock signal lines and even-numbered clock signal lines; and
a pull-down module, wherein an input terminal of the pull-down module is electrically connected to the control module, an output terminal of the pull-down module is electrically connected to the clock signal lines, and the pull-down module is configured to pull down a voltage on the odd-numbered clock signal lines or on the even-numbered clock signal lines according to the control signal;
wherein a number of the initial signal lines is smaller than a number of the clock signal lines,
the control module is electrically connected to input terminals of multiple initial signal lines;
an input terminal of the level conversion module is electrically connected to output terminals of the multiple initial signal lines, and an output terminal of the level conversion module is electrically connected to input terminals of multiple clock signal lines;
an input terminal of the pull-down module is electrically connected to the control module, and an output terminal of the pull-down module is electrically connected to the multiple clock signal lines; and
output terminals of the clock signal lines are electrically connected to the panel body.

* * * * *